United States Patent [19]

Chang

[11] Patent Number: 5,367,682
[45] Date of Patent: Nov. 22, 1994

[54] DATA PROCESSING VIRUS PROTECTION CIRCUITRY INCLUDING A PERMANENT MEMORY FOR STORING A REDUNDANT PARTITION TABLE

[76] Inventor: Steven Chang, 2421 W. 205th St., Ste. D-100, Torrance, Calif. 90501

[21] Appl. No.: 692,619

[22] Filed: Apr. 29, 1991

[51] Int. Cl.$^5$ ............. G06F 9/445; G06F 11/16; G06F 12/16
[52] U.S. Cl. ............. 395/700; 395/425; 364/DIG. 1; 371/10.2
[58] Field of Search .......... 395/425, 700; 371/10.1, 371/10.2

[56] References Cited

U.S. PATENT DOCUMENTS

| | | | |
|---|---|---|---|
| 4,975,950 | 12/1990 | Lentz | 364/DIG. 1 |
| 5,086,502 | 2/1992 | Malcolm | 395/575 |
| 5,121,345 | 6/1992 | Lentz | 395/550 |
| 5,136,711 | 8/1992 | Hugard et al. | 395/700 |
| 5,144,659 | 9/1992 | Jones | 380/4 |

Primary Examiner—Glenn Gossage
Attorney, Agent, or Firm—I. Michael Bak-Boychuk

[57] ABSTRACT

A virus protection system, which may be coupled to an external input/output port of a disk operated data processing system, includes a read only memory in which a redundant partition table is stored, duplicating a partition table on the disk. The virus detection system further includes detection logic which monitors a transfer of data from the disk to a system random access memory and which detects data transfers to a high region of the system memory during initial portions of the transfer. When a virus is detected, the redundant partition table is written onto the disk.

3 Claims, 2 Drawing Sheets

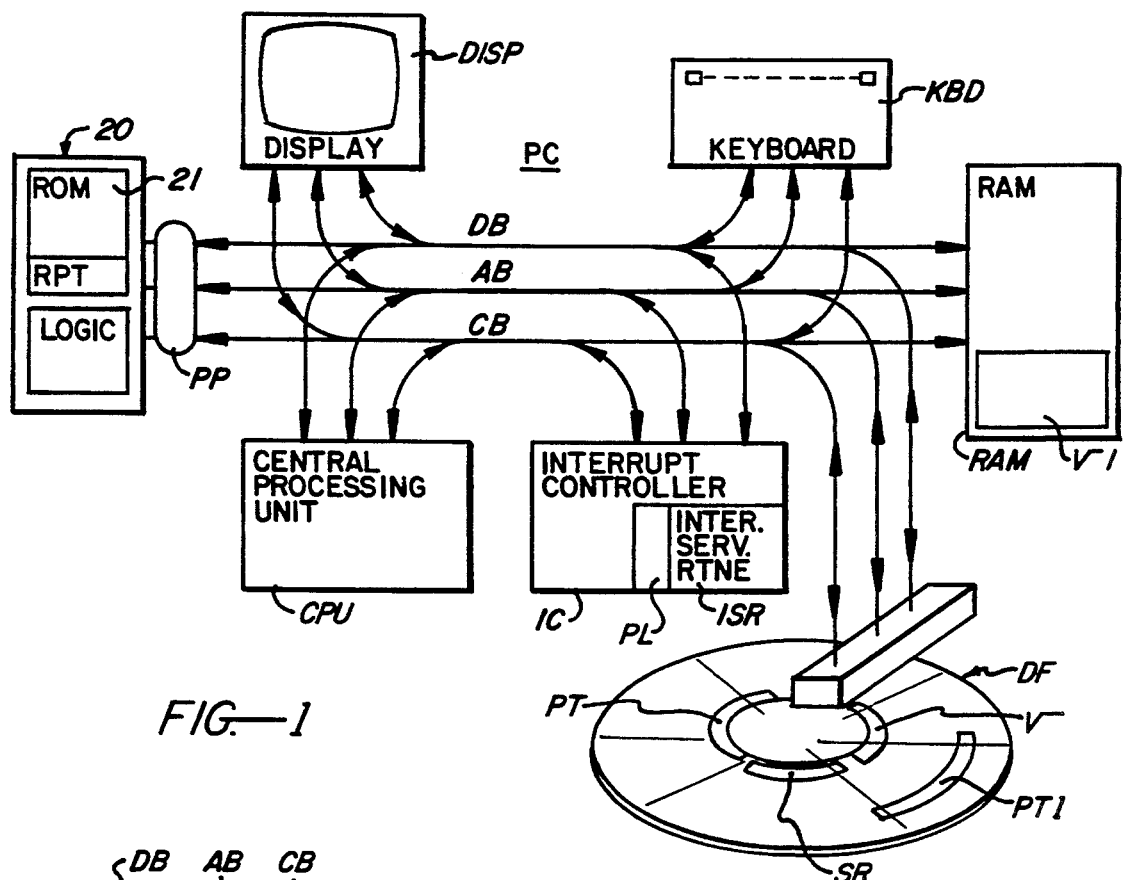
FIG.—1
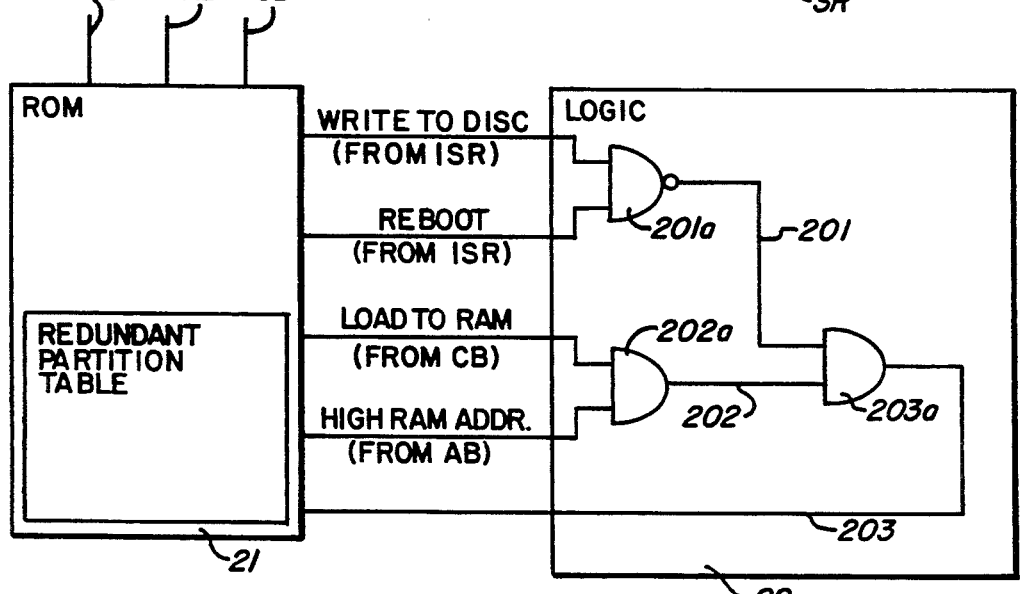
FIG.—3

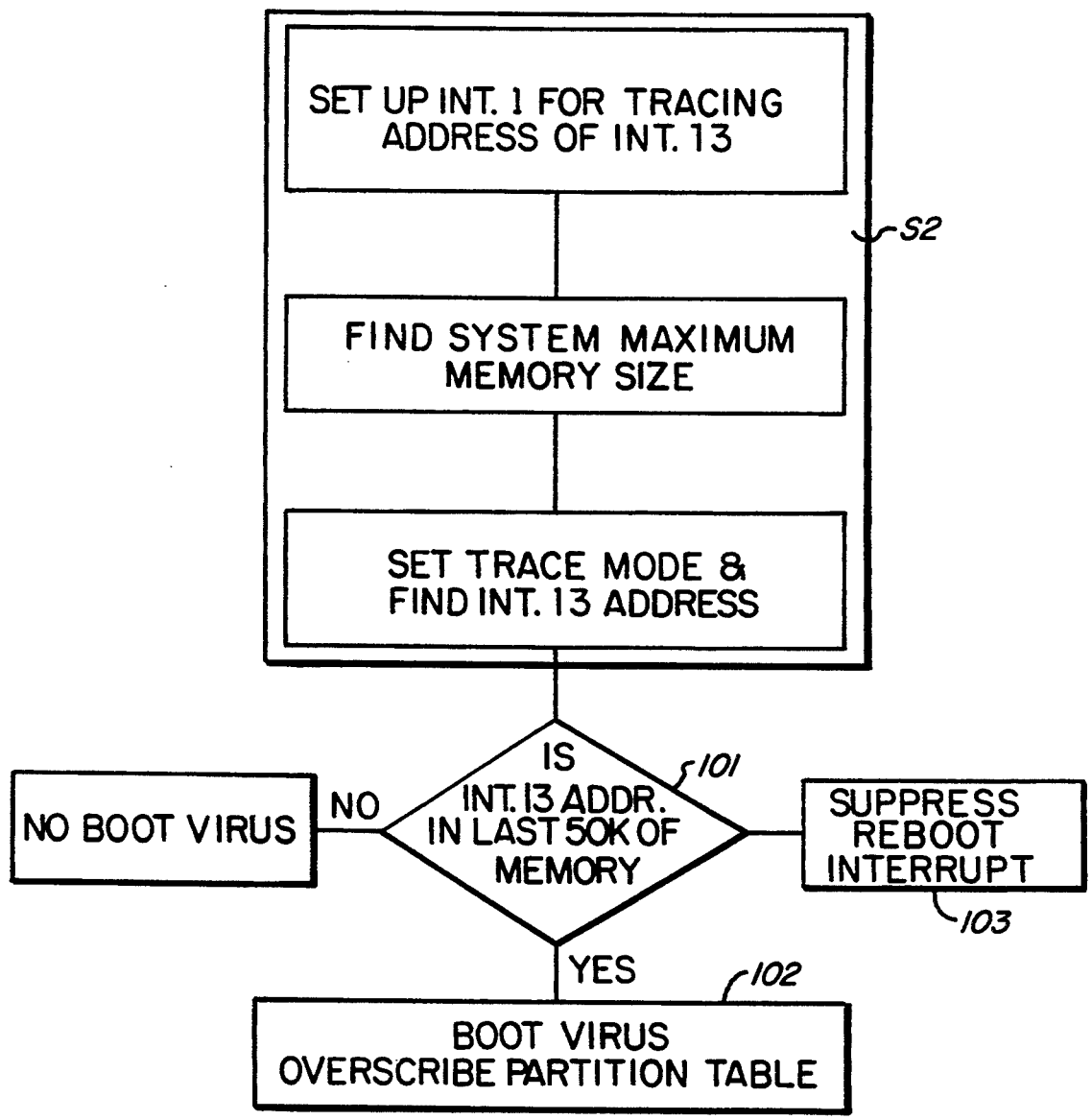
FIG.—2

DATA PROCESSING VIRUS PROTECTION CIRCUITRY INCLUDING A PERMANENT MEMORY FOR STORING A REDUNDANT PARTITION TABLE

BACKGROUND OF THE INVENTION

1. Field of the Invention

The present invention relates to software protecting systems and more particularly to protection systems conformed to recognize and correct the most fundamental processing functions.

2. Description of the Prior Art

The advent of personal computers (PCs) has brought with it extensive snaring of data and programs. Thus, it is now a common practice to use commercial communication networks as a part of a personal computer system. Once tied to such a network, any PC resident system is susceptible to external modification.

Recently, the unauthorized access to a data processing system has grown as an item of vandalism and the term "computer virus" is now a generic term for program code selected to do mischief in a targeted system.

The variety of forms of such a virus is virtually unbounded. Of particular interest, however, are those viruses that destroy disk resident programs, as a matter of mischief. Most pernicious amongst the latter are "viruses" that inscribe directly onto the boot sector, i.e., viruses directed at the partition table of a disk. Since the boot sector and partition table are the first items of data in any "boot up" of a disk resident system, a virus in that location is virtually without any defense. Any disk operated system (DOS) relies on access to operating programs stored on a disk and the disk storage is defined by disk sector location, or the partition table. Thus, a virus inscribed at the "boot sector" cannot be corrected without major architectural reconfiguration of the hardware in the P.C.

This inherent dilemma in all disk operated systems has had few solutions in the past. These same aspects are an attraction to those bent on vandalism, and the virus species known as the "boot sector virus" is now a favorite item of mischief, Defensive techniques for the boot sector virus are therefore extensively sought and it is one such technique that is disclosed herein.

SUMMARY OF THE INVENTION

Accordingly, it is the general purpose and object of the present invention to provide a technique for correcting unwanted data inscribed at the disc sector table.

Other objects of the invention are to provide an externally connected backup memory in which a redundant disc partition table is inscribed.

Yet further objects of the invention are to provide a disk resident program which is invoked in the primary stages of the boot sequence and which is conformed to detect a virus in the disc boot sector.

Briefly, these and other objects are accomplished within the present invention by a combination including a software routine and an externally plugged in read only memory (ROM) in which a redundant copy of the disk partition table is stored. The software routine takes benefit of the interrupt logic resident in the data processing unit to recognize a virus at the disc boot sector level.

More precisely, a boot sector virus, to be effective against all other disc resident protective software systems must take effect before such routines are brought up to the system random access memory (RAM) from the disc. Thus, a boot sector virus, in substantially all of its forms, must invoke early on the interrupt sequence "write to disc" in order to replicate itself to another boot sector. This write to disc interrupt, known in conventional practice as "interrupt 13" in a standard personal computer organization, is combined with a load instruction into a high memory location of the system memory (RAM). These two concurrent conditions are monitored in the early portions of the boot cycle, with the conventional boot sequence temporarily suppressed, in order to identify the presence of the virus. In conventional practice this boot sequence is invoked by a interrupt 21. Once a virus is thus identified the boot sector partition table stored in the ROM is then overscribed onto the boot sector, thereby destroying the virus.

In this manner a software routine set to operate on the conditions of the following algorithm during the boot sequence:

(i) interrupt 13 invoking; and
(ii) loading of data into a high order segment (address) of the system RAM determiners the principal conditions of a boot sector virus. If such condition exist, the disc partition table, stored externally in a ROM, is then written onto the disc boot sector.

It should be noted that the foregoing sequence may go into effect even without the actual presence of a virus. Nonetheless, these occasionally redundant instances are minimal in their time delay, particularly since the ROM, storing the redundant partition table, is plugged into a parallel I/O port.

BRIEF DESCRIPTION OF THE DRAWING

FIG. 1. is a diagrammatic illustration of a typical disc operated personal computer system incorporating therein the inventive protection system;

FIG. 2 is a flow chart useful in understanding the invention disclosed herein; and FIG. 3 is a diagrammatic illustration of the signal flow sequence in accordance with the present invention.

DESCRIPTION OF THE PREFERRED EMBODIMENT

The present invention utilizes the interrupt system normally incorporated in a personal computer (PC). For a complete presentation, reference is therefore made to a typical interrupt request arrangement, it being understood that the instant invention makes no claim to the operative characteristics of a typical interrupt system.

By reference to FIG. 1, a conventional data processing system PC is organized around a central processing unit (CPU) to which an address bus (AB), data bus (DB), and a control bus (CB) are connected. Also connected to buses AB, DB and CB are various controllers including an interrupt controller IC and various memory and peripheral devices such as a system random access memory (RAM), a display (DISP), keyboard (KBD) and disk file (DF).

In normal operation,the central processing unit (CPU) executes the program sequence in the RAM. Since such program execution may conflict with other competing demands, e.g., the refresh cycle in the display (DISP), this execution may be periodically suspended in response to the demand from the device or circuit that then needs CPU servicing. Once suspended, an interrupt service routine (ISR) is executed, servicing the device.

There may be more than one level to such interrupt requests and there may be priority logic PL in the interrupt controller IC resolving competition between concurrent interrupt requests. Included in such interrupt logic are the controller demands of the disc file DF which, in conventional practice, is assigned an interrupt request for both "read from disc" and "write to disc". The "write to disc" request is normally assigned an interrupt request designation 13.

One should note that the system RAM is normally without any information at startup. Most RAMS require power to maintain storage and once the power is shut off, the memory contents are destroyed. For this reason, the instruction set necessary for operation is maintained in the disc file DF and, when the system is turned on, those portions of the instruction set in the disk file DF are brought up to the system RAM. This process is called "booting" or "booting up" from disk and a system based on instructions residing in a disk file is referred to as a disc operated system, or DOS.

A disk, however, is organized into partitions, or sectors. This organization is inscribed in a "partition table" (PT) on one of the inner disk ranks. Within this partition table, the program controlling the system is identified. Thus, when the disk program is "booted" into the system RAM, the partition table PT is a necessary reference; otherwise, the disc cannot be booted into the memory.

It is this partition table (PT) that is typically attacked by a boot sector virus. More precisely, a boot sector virus replaces its code instead of the partition table (PT). Since a partition table is nonetheless required, even for the operation of the virus, the virus process then needs to transfer the partition table to another portion of the disc, shown as partition table PT1. The overlaid virus code V then effects a pointer function to this new partition table PT1, thereby acquiring control. Of course, the process of transferring PT1 invokes the interrupt request "write to disc", interrupt 13. At the same time, the virus V, in order to control the further following functions in the system must also transfer the whole or any portion of its code into system RAM, shown as V1. Again, this requires control operations within the interrupt controller IC and a high order memory location to leave room for the other operations entailed in a "boot". (Note: the PC system is a disc operated system—DOS—which initially transfers from disc to RAM the operating system instructions). Thus, any boot sector virus must satisfy these two conditions very early in the boot cycle.

In accordance with the present invention, a parallel I/O port PP normally connected to the bus system including busses DB, AB and CB is externally connected at the other side to a backup printer storage 20 comprising a read only memory (ROM) 21 in which a redundant partition table (RPT) is stored. Concurrently, a software routine (SR) is provided in the disk file (DF) to be transferred into system RAM upon the condition: interrupt 13 is invoked i.e., there is a "write to disc" interrupt request on the control bus CB. This condition is recognized by further firmwired logic 22 in the backup storage 20 which, on recognizing the above condition, issues a load instruction loading SR from disc into the memory RAM.

As shown in the flow chart of FIG. 2, step 101 is then executed which tests: is the interrupt 13 address vectored to a high (e.g. last 50K bytes) portion of the system RAM. If the test 101 is met then the next step 102 is executed, directing a write-to-disk instruction to overwrite the redundant partition table (RPT) code from ROM 21 onto the boot sector track. In this step, any virus V overscribed over the original partition table PT is destroyed and the disk is restored to its normal configuration.

It should be noted that the above tests require that the disc contents not be booted into the system RAM. Accordingly, a third parallel step 103 is also provided which suppresses (masks) the reboot interrupt. Once the partition table PT is overlaid the system returns to its normal operation.

By reference to FIG. 3, the resulting signal flows are as follows:

(i) on receipt of a write to disk interrupt the reboot interrupt is masked, shown as NAND logic combination 201a issuing signal 201;

(ii) concurrently, the address bus AB and control bus CB are tested in a logical AND 202a for a load high to RAM address instruction, shown as signal 202;

(iii) signals 201 and 202 are then combined in an AND logical combination 203a to produce signal 203;

(iv) signal 203 then selects the command to write the redundant partition table RPT, stored in ROM 21, to disk.

It should be noted that the write to disk, reboot interrupt, address and control functions in the foregoing signal sequence may each be decoded within the ROM 21. Thus, ROM 21 is both recognition mechanism and also the source for the redundant partition table RPT, and is therefore self effecting. The external addition of logic 22 effectively decouples the virus recognition and the subsequent partition table overwrite functions from the internal cycles of the processor PC. In this manner a quick, inexpensive, backup arrangement is provided to protect against boot sector virus.

Obviously many modifications and changes may be made to the foregoing description without departing from the spirit of the invention. It is therefore intended that the scope of the invention be determined solely on the claims appended hereto.

What is claimed is:

1. A virus protection system for a data processing system characterized by a central processing unit, a system memory, a permanent data storage including a disk and control means for reading and writing data from and to said disk, respectively, bus system interconnecting said central processing unit, said system memory, and said permanent data storage, said bus system connected to a communication port, wherein instructions are recorded on said disk of said permanent data storage in sector locations thereon determined by a partition table stored on said disk, said data processing system including interrupt logic for controlling a transfer of said instructions to said system memory, the virus protection system comprising:

a permanent memory connected to said port and said bus system and having stored thereon a redundant hard disk partition table including means for detecting the transfer of said instructions into a selected portion of said system memory; and a logic circuit, connected to said permanent memory and rendered operational upon detecting said transfer of said instructions into said selected portion of said system memory, for selecting a command to write the redundant hard disk partition table stored on the permanent memory to said disk.

2. Apparatus according to claim 1 wherein: said permanent memory comprises a read only memory.

3. Apparatus according to claim 2 wherein: said permanent memory and said logic circuit are located externally to said data processing system.

* * * * *